(12) United States Patent
Drymiller (10) Patent No.: US 12,508,497 B1
(45) Date of Patent: Dec. 30, 2025

(54) DIE FOR GAME

(71) Applicant: David Drymiller, Bartlett, IL (US)

(72) Inventor: David Drymiller, Bartlett, IL (US)

( * ) Notice: Subject to any disclaimer, the term of this patent is extended or adjusted under 35 U.S.C. 154(b) by 806 days.

(21) Appl. No.: 17/658,880

(22) Filed: Apr. 12, 2022

(51) Int. Cl.
*A63F 9/04* (2006.01)

(52) U.S. Cl.
CPC .... *A63F 9/0415* (2013.01); *A63F 2009/0435* (2013.01); *A63F 2009/0477* (2013.01); *A63F 2009/0497* (2013.01)

(58) Field of Classification Search
CPC .. A63F 9/04; A63F 9/0415; A63F 2009/0435; A63F 2009/0477; A63F 2009/0479
USPC ........................................................ 273/146
See application file for complete search history.

(56) References Cited

U.S. PATENT DOCUMENTS

| | | | | |
|---|---|---|---|---|
| 176,532 A * | 4/1876 | Hughes | ................... | G09B 17/00 |
| | | | | 273/157 R |
| 550,563 A * | 11/1895 | Pierce, Jr. | ............... | A63H 33/04 |
| | | | | 273/157 R |
| 2,090,837 A * | 8/1937 | Gould | .................... | A63F 9/0413 |
| | | | | 273/146 |
| 2,315,164 A * | 3/1943 | Schiller | .................. | A63F 9/0413 |
| | | | | 426/112 |
| 3,100,642 A * | 8/1963 | Goldstein | .............. | B65D 81/36 |
| | | | | 273/287 |
| 3,258,268 A * | 6/1966 | Treinis | ................... | A63F 9/0413 |
| | | | | 229/122 |
| 3,899,838 A * | 8/1975 | Lalley | .................... | A63F 9/0415 |
| | | | | 434/189 |
| 4,092,029 A | 5/1978 | Jones | | |
| 4,428,580 A * | 1/1984 | Pasquine | .................... | A63F 9/04 |
| | | | | 273/145 C |
| 4,778,392 A * | 10/1988 | Mitchell | ................... | G09B 1/00 |
| | | | | 229/113 |
| 5,082,288 A * | 1/1992 | Swartz | .................. | A63F 9/0402 |
| | | | | 273/287 |
| 5,273,430 A | 12/1993 | Strychewski | | |
| 5,679,002 A | 10/1997 | Scelzo | | |
| 5,688,126 A | 11/1997 | Merritt | | |
| 5,782,471 A | 7/1998 | Bautista et al. | | |
| 5,918,882 A | 7/1999 | Truong | | |
| 5,927,717 A | 7/1999 | Berkovi et al. | | |
| 5,944,312 A * | 8/1999 | Darneille | ........... | G09B 19/0092 |
| | | | | 273/157 R |
| 6,089,871 A | 7/2000 | Jaffe | | |

(Continued)

FOREIGN PATENT DOCUMENTS

| | | |
|---|---|---|
| CN | 101557863 A | 10/2009 |
| GB | 2393132 B | 4/2006 |
| WO | 2008063044 A1 | 5/2008 |

*Primary Examiner* — Joseph B Baldori
(74) *Attorney, Agent, or Firm* — Paul J. Nykaza (57) ABSTRACT

A 10-sided die (10) has an outer skin (14) and an insert (12). The outer skin (14) defines 10 faces wherein respective faces of the die (10) are numbered consecutively from 0 to 9. The outer skin (14) further defines an internal cavity (70) and a plurality of inner surfaces opposite the respective faces and facing the internal cavity. The insert (12) is positioned in the internal cavity (70). The insert (12) has a plurality of outer surfaces wherein the plurality of outer surfaces of the insert (12) are positioned respectively in confronting relation to the plurality of inner surfaces of the outer skin (14). The insert (12) resists compressive force applied to the outer skin (14).

1 Claim, 9 Drawing Sheets

(56) References Cited

U.S. PATENT DOCUMENTS

| | | | |
|---|---|---|---|
| 6,209,870 B1 * | 4/2001 | Shea | A63F 9/0415 |
| | | | 273/245 |
| 6,637,138 B2 * | 10/2003 | Prost | G09F 19/12 |
| | | | 40/538 |
| 6,648,648 B1 | 11/2003 | O'connell | |
| 7,077,654 B2 | 7/2006 | Burtness | |
| 7,452,211 B1 * | 11/2008 | Helsel | G09B 1/40 |
| | | | 434/403 |
| 8,128,407 B2 | 3/2012 | Brett | |
| 8,419,017 B1 * | 4/2013 | Lazare | A63F 3/00006 |
| | | | 273/287 |
| 8,651,869 B1 * | 2/2014 | Lassalle | A63F 1/04 |
| | | | 434/128 |
| 8,708,703 B2 | 4/2014 | Fluster | |
| 10,325,516 B1 | 6/2019 | Drymiller | |
| 10,463,952 B2 * | 11/2019 | Read | A63F 9/0468 |
| 2004/0026859 A1 * | 2/2004 | Hodgeman | A63F 7/06 |
| | | | 273/288 |
| 2004/0239031 A1 * | 12/2004 | Dewa | A63F 3/00075 |
| | | | 273/260 |
| 2005/0051961 A1 * | 3/2005 | Hodgeman | A63F 7/06 |
| | | | 273/108 |
| 2005/0073093 A1 * | 4/2005 | Byrd | A63F 9/0415 |
| | | | 273/146 |
| 2007/0200291 A1 * | 8/2007 | McEowen | A63F 9/0415 |
| | | | 273/146 |
| 2011/0133402 A1 * | 6/2011 | Colley | A63F 9/1204 |
| | | | 273/160 |
| 2011/0275038 A1 | 11/2011 | Penner | |
| 2013/0026710 A1 | 1/2013 | Sambriski | |
| 2014/0159307 A1 * | 6/2014 | MacIntyre-Melody | A63F 9/04 |
| | | | 273/146 |
| 2016/0051889 A1 * | 2/2016 | Romano | A63F 9/001 |
| | | | 206/216 |
| 2024/0165499 A1 * | 5/2024 | Lauby | A63F 9/0415 |

* cited by examiner

DIE FOR GAME

CROSS-REFERENCE TO RELATED APPLICATIONS

None.

FEDERALLY SPONSORED RESEARCH OR DEVELOPMENT

None.

TECHNICAL FIELD

The invention relates generally to a die for a game such as a board game, and, in particular, to a decahedron-shaped 10-sided die having a flexible outer skin and an insert wherein the insert resists compressive force applied to the outer skin.

BACKGROUND OF THE INVENTION

Games such as board games are well known and take various forms. Such games often use companion components, sometimes referred to as manipulatives, used by players during play of the game. For example, player identification pieces, game play cards and a random number generator such as a die or dice are often used in play of games. A die or dice (multiple die) are often rolled by a player to generate random numbers in the play of the game.

Certain board games may be designed for play by children of various ages and may be considered educational games. In such games, the manipulatives including the associated die may have certain design characteristics to generate stimuli and enhanced interest from young players. In one example, a die may be a paper-based and hollow member that is very light-weight allowing ease of use by young game players. The paper-based die can further have varying colors and sizes depending on desired characteristics of the game. The die can also have a different number of faces instead of a traditional six-sided, cube-shaped die.

For example, a 10-sided die having a decahedron shape can be used. In such cases, a 10-sided, decahedron-shaped die typically has a hollow interior. This type of die is shown, for example, in U.S. Pat. No. 10,325,516, which is expressly incorporated by reference herein. This type of die is easily rolled by young players during play of the game. Certain young child players, however, can be more aggressive in the handling of game manipulatives including the die. The combination of the hollow construction of the die and certain aggressive young players, can lead to the die becoming deformed. Children may squeeze the die and irreparably damage the die requiring replacement. Additional reinforcement for the die in such cases would be desirable.

While such game manipulatives such as game dice according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides an enhanced game die for use in games such as board games, and particularly in use with children's board games. The die of the present invention has a reinforcement structure to minimize damage from overly aggressive children handling the die during play of the game.

According to a first aspect of the invention, the game die has a flexible outer skin defining a plurality of faces. The faces have indicia thereon, and the outer skin defines an internal cavity. The die further has an insert positioned in the internal cavity wherein the insert resists compressive force via hand pressure of a user applied to the outer skin.

According to another aspect of the invention, a 10-sided die has an outer skin and an insert. The outer skin defines 10 faces, respective faces of the die numbered consecutively from 0 to 9. The outer skin defines an internal cavity and a plurality of inner surfaces opposite the respective faces and facing the internal cavity. The insert is positioned in the internal cavity, and the insert has a plurality of outer surfaces. The plurality of outer surfaces of the insert are positioned respectively in confronting relation to the plurality of inner surfaces of the outer skin wherein the insert resists compressive force applied to the outer skin.

According to a further aspect of the invention, the insert comprises a plurality of inserts positioned in the internal cavity.

According to another aspect of the invention, the outer skin is a paper material. The insert is also a paper material. In an exemplary embodiment, the insert is formed from 65-pound weighted paper, and the outer skin is formed from 65-pound weighted paper.

According to a further aspect of the invention, the outer skin is an integral member having a plurality of folds defining the 10 faces between respective folds, the integral member further defining a plurality of connection tabs secured to the inner surfaces of the outer skin to define the die.

According to another aspect of the invention, the insert is an integral member having a plurality of folds and further defining a plurality of connection tabs secured to inner surfaces of the integral member of the insert to define the insert.

According to a further aspect of the invention, the insert comprises a plurality of inserts positioned adjacent to one another. The plurality of inserts occupies substantially the entire internal cavity.

According to a further aspect of the invention, the inner surfaces of the outer skin are in confronting relation to one or more of outer surfaces of the inserts. The inner surfaces of the outer skin may be in surface-to-surface engagement with the outer surfaces of the inserts.

According to a further aspect of the invention, the insert defines an inner cavity wherein the insert has an internal wall traversing the inner cavity. In a further exemplary embodiment, the internal wall comprises a plurality of internal walls. The internal wall comprises a first internal wall adjacent a second internal call wherein the first internal wall is in confronting relation to the second internal wall.

According to yet another aspect of the invention, a second 10-sided die is provided wherein the second 10-sided die has a size different from the first 10-sided die. In another exemplary embodiment, a second 10-sided die is provided wherein the second 10-sided die has a color visually perceptively different from a color of the first 10-sided die.

According to another aspect of the invention, the outer skin forms a decahedron shape, and wherein the insert comprises a plurality of inserts that collectively form an insert decahedron shape dimensioned to fit within the decahedron shape of the outer skin.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
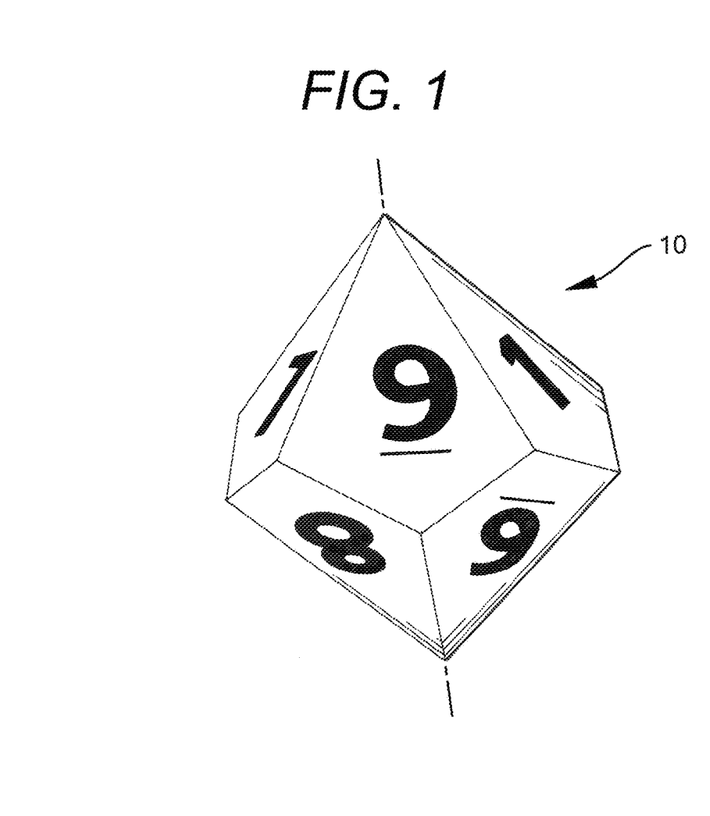
FIG. 1 is a perspective view of a die for a game according to an exemplary embodiment of the present invention.
Figure 2:
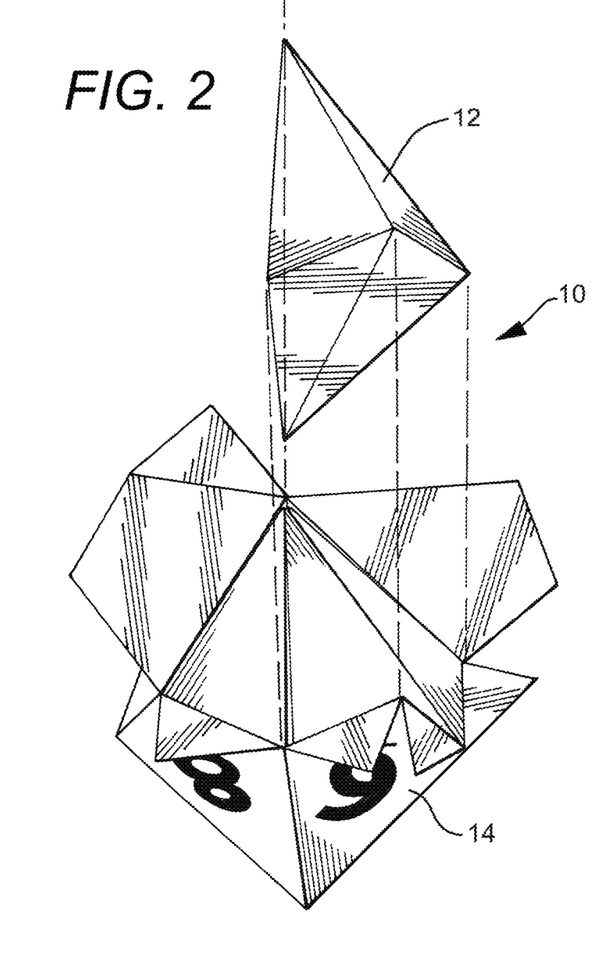
FIG. 2 is an exploded perspective view of the game die showing an insert spaced from an outer skin of the game die.

Referring to the drawings, FIGS. 1-2 disclose a physical training aid, or manipulative, used for a board game wherein the manipulative is in the form of a die. As described in greater detail below, the die is a 10-sided, decahedron-shaped die in one exemplary embodiment of the invention. Other shaped die could also be utilized.

As discussed, board games often use manipulatives as part of the game. Game players use the manipulatives during play of the game. One form of manipulative is a random-number generator in the form of a game die. Certain games may use a plurality of die or dice in play of the game depending on the structure and rules of the game. Game players or users pick up the die and roll the die to generate a number used in play of the game.

As further shown in FIGS. 1-2, the 10-sided die has a decahedron shape and is generally designated with the reference numeral 10. The sides, or faces, are connected to respective adjacent sides at particular angles to form a three-dimensional configuration. The three-dimensional configuration has a plurality of apexes, or vertices, formed at adjacent sides of the die 10 converging to form a respective apex. Each side abutting an adjacent side abuts the side and defines a line around a perimeter of each side. Each side or face is generally kite-shaped, or quadrilateral-shaped. It is understood that other shapes are also possible. As the die 10 in an exemplary embodiment is used as a random number generator, each side has a different numeral thereon. Thus, the respective 10 sides are demarcated from 0 consecutively to 9 in an exemplary embodiment. Different indicia configurations on the die 10 are also possible depending on the type of game or other rules for the game.

In an exemplary embodiment, the die 10 is used in an educational children's game. As the die 10 is generally paper-based, the die 10 is generally lighter in weight, and easily handled by a child. Such configuration provides a desired tactile feel for younger players. Thus, in an exemplary embodiment, the die 10 is formed from a paper-based member such as a card-stock type weighted paper. It is understood that the die 10 can take additional forms such as being formed in additional sizes and colors.

As further shown in FIG. 2, the die 10 generally includes a rigidity-adding insert 12 received in an outer skin 14. As will be described in greater detail below, both the insert 12 and the outer skin 14 are paper-based members in an exemplary embodiment although other materials can also be utilized. As explained in greater detail below, the paper-based members are selected from card stock weighted paper in exemplary embodiments. The structures of the insert 12 and outer skin 14 will first be described followed by a description of connection and operation of the die 10.

FIGS. 3-12 further show the rigidity-adding insert 12. As discussed in greater detail below, the insert 12 has a configuration that, in a cooperative configuration with additional insert(s), provides increased rigidity to the die 10. Thus, the paper-based outer skin 14 has an initial, inherent rigidity based on the properties of the paper material, and the insert 12 possesses structure that adds to and enhances the rigidity of the die 10. The insert 12 has a unique pyramid-type shape, or an irregular pyramid-type shape. The insert 12 has an initial flat or unfolded configuration. The insert 12 has a series of tabs extending from certain segments of a planar member wherein the member is folded sequentially at certain locations to form the insert 12.

Figures 3, 4, 5:
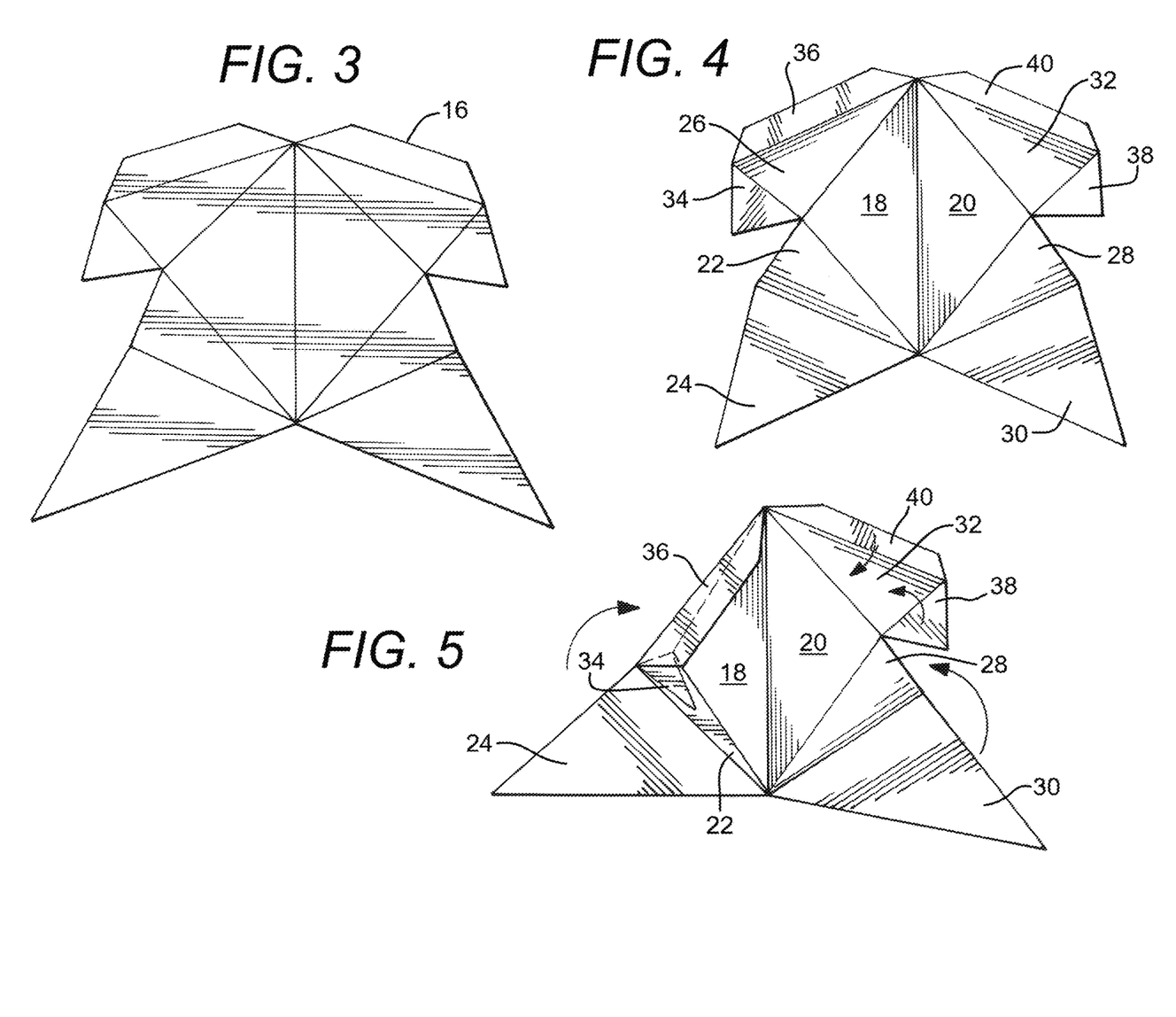
FIG. 3 is a plan view of the insert in an unfolded configuration.
FIGS. 4-11 show the insert with sequential folds to form the insert in a folded configuration.

FIG. 3 shows the insert 12 in the initial flat or unfolded configuration. The insert 12 has an insert planar member 16. The insert planar member 16 has a star-like configuration or a body-like configuration absent a head member. The planar member 16 is divided into a plurality of different segments and connection tabs. It is understood that the segments and connection tabs are integral on the planar member 16 in an exemplary embodiment and demarcations between segments are folded as described in greater detail below. Thus, the planar member 16 may further be described as an insert integral member.

As further shown in FIGS. 3-4, the insert planar member 16 has a first body segment 18 adjacent a second body segment 20 generally located at a central portion of the insert planar member 16. The first body segment 18 and the second body segment 20 each have an identical triangular shape and in one exemplary embodiment, the segments 18,20 are isosceles triangles integrally connected together at respective bases of the triangles. The insert planar member 16 further has a first proximal leg 22 integrally connected to the first body segment 18. The first proximal leg 22 has a triangular-shape in one exemplary embodiment. The insert planar member 16 further has a first distal leg 24 integrally connected to the first proximal leg 22 opposite to the first body segment 18. The first distal leg 24 also has a triangular-shape. The insert planar member 18 also has a first shoulder 26 integrally connected to the first body segment 18. The first shoulder 26 also has a triangular-shape.

As further shown in FIGS. 3-4, the insert planar member 16 further has a second proximal leg 28 integrally connected to the second body segment 20. The second proximal leg 28 has a triangular-shape in one exemplary embodiment. The insert planar member 16 further has a second distal leg 30 integrally connected to the second proximal leg 28 opposite to the second body segment 20. The second distal leg 30 also has a triangular-shape. The insert planar member 16 also has a second shoulder 32 integrally connected to the second body segment 20. The second shoulder 32 also has a triangular-shape.

As further shown in FIGS. 3-4, the first shoulder 26 has a first insert connection tab 34 integrally extending from a side of the first shoulder 26. The first insert connection tab 34 has a triangular-shape. The first shoulder 26 further has a second connection tab 36 integrally extending from an adjacent side of the first shoulder 26. The second connection tab 36 has a generally trapezoid-shape. Similarly, the second shoulder 32 has a third insert connection tab 38 integrally extending from a side of the second shoulder 32. The third insert connection tab 38 has a triangular-shape similar to the first insert connection tab 34. The second shoulder 32 further has a fourth connection tab 40 integrally extending from an adjacent side of the second shoulder 32. The fourth connection tab 40 has a generally trapezoid-shape similar to the second insert connection tab 36.

Figure 6:
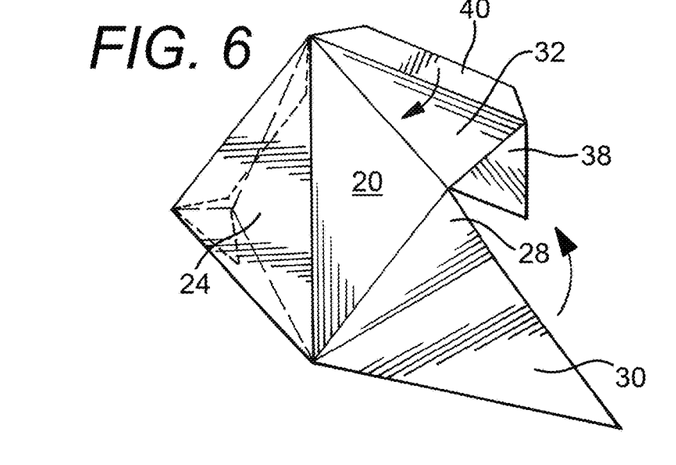

As shown in FIGS. 4-12, the insert planar member 16 is subjected to a series of folds and connections representing a method of forming the insert 12. As can be appreciated from FIGS. 4 and 5, the first insert connection tab 34 is folded inward at the interface with the first shoulder 26 and the first proximal leg 22 is folded at the interface with the first body segment 18. The first insert connection tab 34 is secured/connected to the first proximal leg 22 as can be appreciated from FIG. 5. In one exemplary embodiment, adhesive is used to secure the first insert connection tab 34 to the first proximal leg 22. Other connection methods could also be used such as tape, staples or other connection structures. The connection of the first insert connection tab 34 further requires the first shoulder 26 to be folded upwards at the interface with the first body member 18. As further shown in FIG. 5, the second insert connection tab 36 is folded towards the first body member 18 at the interface with the first shoulder 26. As shown in FIG. 6, the first distal leg 24 is folded at the interface with the first proximal leg 22 to cover the first body segment 18. It is understood that the first distal leg 24 is dimensioned to suitably cover the first body segment 18 and meet a peripheral edge of the second insert connection tab 36. A portion of the first proximal leg 22 is adhesively secured to the surface of the second insert connection tab 36.

Figure 7:
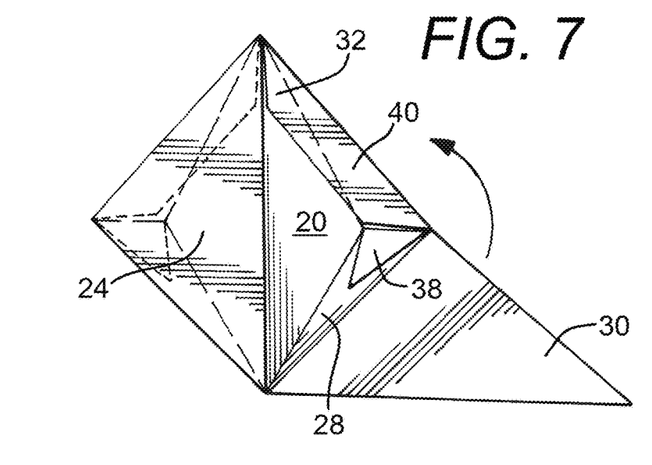
Figure 8:
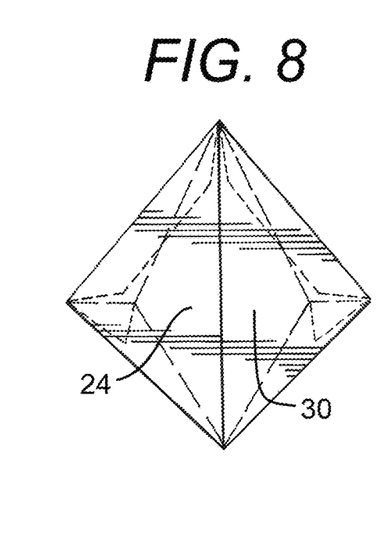

The above-described steps are also performed on an opposite side of the insert planar member 16. As can be appreciated from FIGS. 7 and 8, the third insert connection tab 38 is folded inward at the interface with the second shoulder 32 and the second proximal leg 28 is folded at the interface with the second body segment 20. The third insert connection tab 38 is adhesively connected to the second proximal leg 28 (FIG. 7). As discussed, various connection methods can be used. The connection of the third insert connection tab 38 further requires the second shoulder 32 to be folded upwards at the interface with the second body member 20. As further shown in FIG. 7, the fourth insert connection tab 40 is folded towards the second body member 20 at the interface with the second shoulder 32. As shown in FIG. 8, the second distal leg 30 is folded at the interface with the second proximal leg 28 to cover the second body segment 20. It is understood that the second distal leg 30 is dimensioned to suitably cover the second body segment 20 and meet a peripheral edge of the fourth insert connection tab 40. A portion of the second proximal leg 30 is adhesively secured to the surface of the fourth insert connection tab 40.

Figure 9:
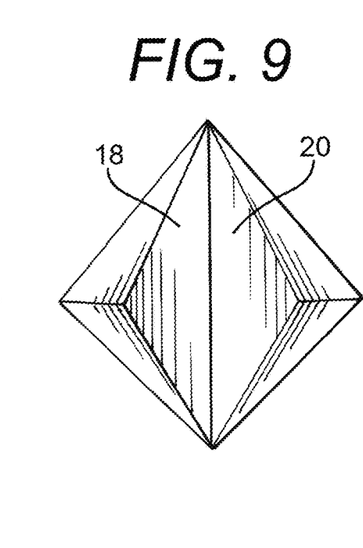
Figure 10:
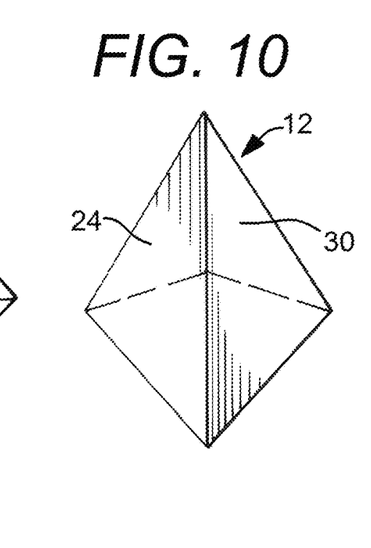
Figure 11:
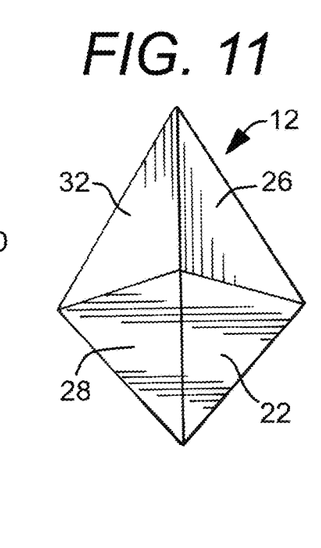
Figures 12, 13:
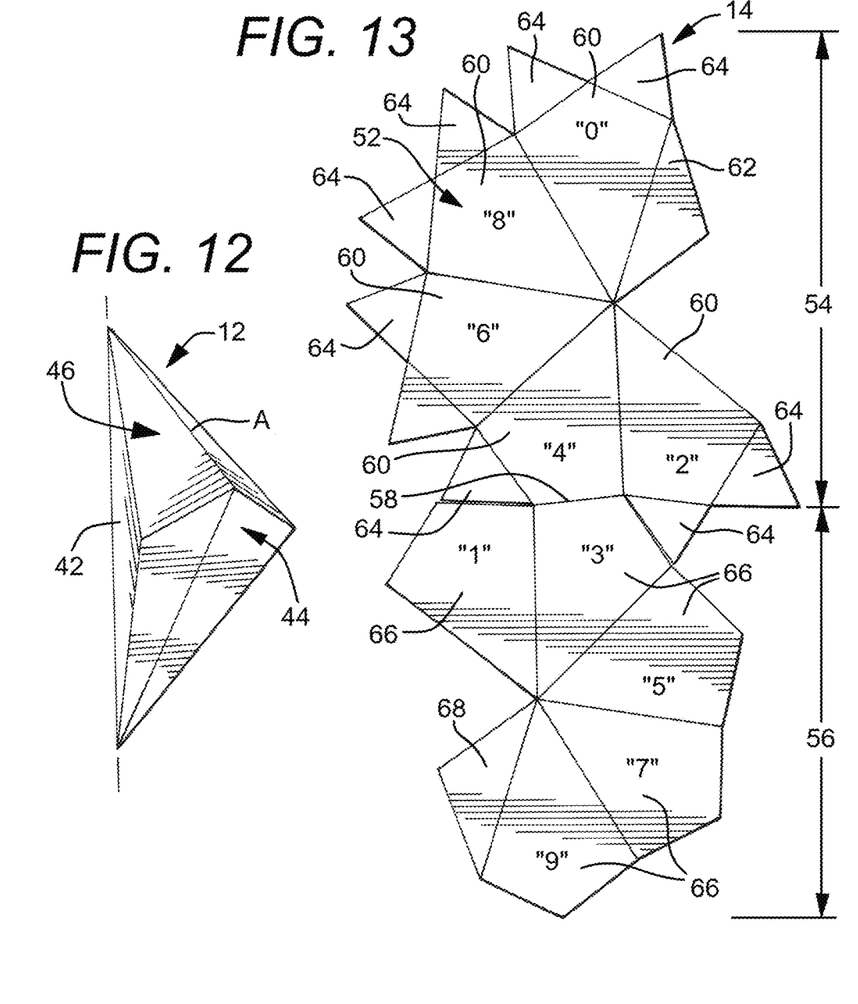
FIG. 12 is a perspective view of the insert in the folded configuration.
FIG. 13 is a plan view of the outer skin of the game die in an unfolded configuration.
Figure 14:
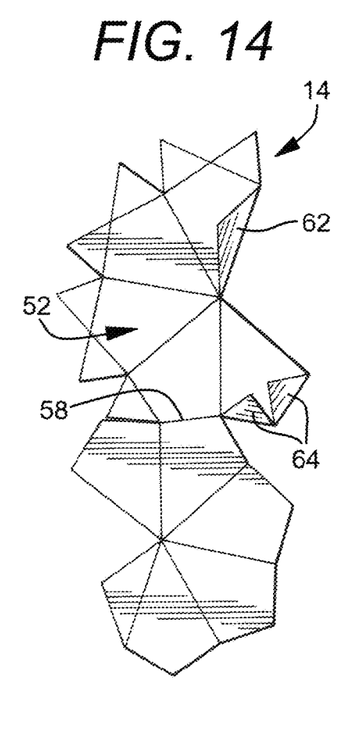
FIGS. 14-17 show the outer skin with sequential folds to form the outer skin and defining an opening in an intermediate folded configuration to receive a plurality of inserts.
Figure 15:
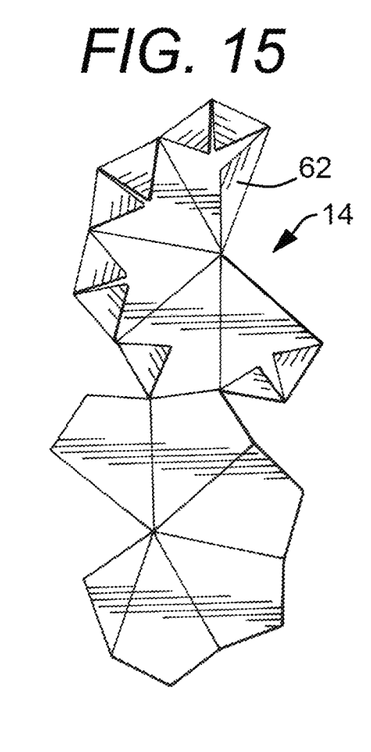
Figure 16:
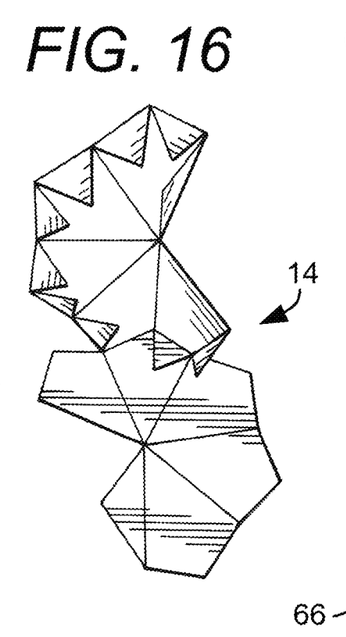
Figure 17:
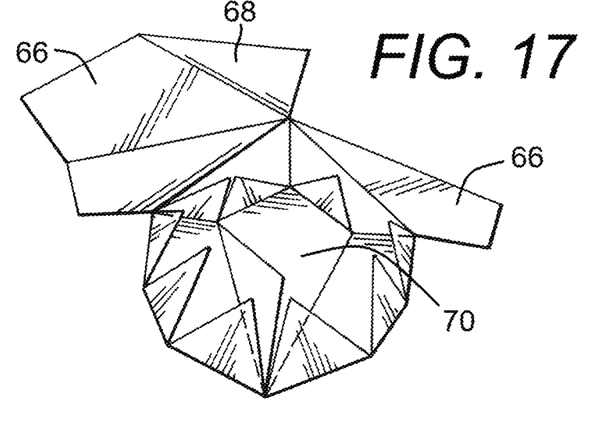
Figures 25, 26, 27:
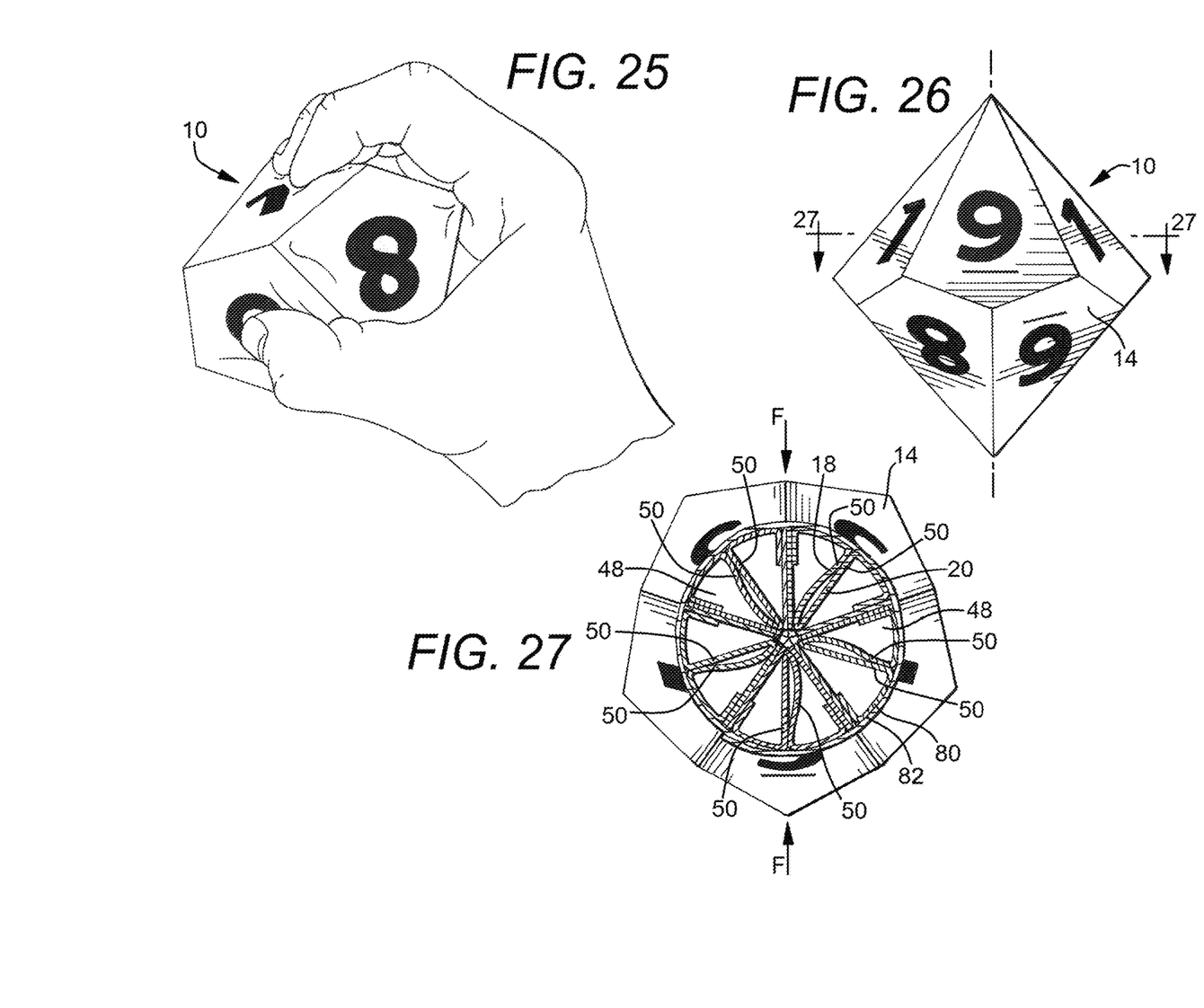
FIG. 25 show the game die being held by a user wherein the game die resists compressive force by a user.
FIG. 26 is a front perspective view of the die.
FIG. 27 is a cross-sectional view of the die taken along lines 27-27 of FIG. 26.

FIG. 8 shows the insert planar member 16 with the above-described folds and connections thus occupying a general diamond-shaped footprint. FIG. 9 shows the configuration of FIG. 8 from an opposite side. As can be appreciated from FIGS. 8-11, a central fold is made at the interface between the first body segment 18 and the second body segment 20. The first body segment 18 is adhesively secured to the second body segment 20 to form the insert 12. FIGS. 10 and 11 show the completed insert 12 from opposite sides and flipped. FIG. 12 shows a perspective view of the completed insert 12 wherein the insert 12 has generally an irregular pyramid shape. As can be appreciated from FIG. 12, the insert 12 has two generally planar outer faces 42 that are triangular in shape. As further shown in FIG. 12, another outer face of the insert 12 is a kite-shaped outer face 44 which will correspond and cooperate with the kite-shaped faces of the outer skin 14 to be further described below. Finally, another outer face is an inclined outer face 46 having an apex A generally at a central location of the inclined outer face 46. This outer face is also generally triangular. As will described below, it will be understood that a half of respective inclined outer faces 46 of adjacent inserts 12 will cooperate with kite-shaped faces of the outer skin 14. With such folded and connected configuration, the insert 12 defines an internal space 48 or inner cavity 48 (FIG. 27). In addition, the insert 12 defines an internal wall 50 (FIGS. 27 and 29) that traverses the internal space 48. The internal wall 50 can comprise a plurality of internal walls 50. In particular, a first internal wall 50 is positioned adjacent a second internal wall 50 wherein the first internal wall 50 is in confronting relation to the second internal wall 50. In an exemplary embodiment, the internal wall 50 corresponds to the first body segment 18 and the second body segment 20. The internal walls 50, in cooperation with other structures of the insert 12, provide rigidity-adding properties to the insert 12 as described in greater detail below.

FIGS. 4-12 illustrate the formation of the insert 12. It is understood that a plurality of inserts 12 are formed and provided under the steps described above. In an exemplary embodiment described herein, a set of five inserts 12 are formed. The five inserts 12 cooperate with other structures to form the die 10 of the present invention to be described in greater detail below.

FIGS. 13-18 further show the outer skin 14. FIG. 13 shows the outer skin 14 in the initial flat or unfolded configuration. The outer skin 14 has a skin planar member 52. The skin planar member 14 has an irregular footprint. The skin planar member 14 generally has a first section 54 and a second section 56 integrally connected at a central connection interface 58. The central connection interface 58 is generally at a mid-section of the skin planar member 14. As described below, the first section 54 and second section 56 of the skin planar member 52 have a plurality of faces and connection tabs which are folded at demarcations to form the outer skin 14 of the die 10. It is understood that the skin planar member 14 may also be referred to as a skin integral member.

As further shown in FIG. 13, the first section 54 has a plurality of integrally connected first face segments 60. In an exemplary embodiment, there are five first face segments 60 and the first face segments 60 are demarcated with the numerals 2, 4, 6, 8 and 0. It is understood that the numerals are inscribed on an opposite side of the first face segments 60 shown in FIG. 13. (For clarity, the numerals are listed on the particular first face segments 60 in FIG. 13.) The first face segments 60 are generally kite-shaped and are generally integrally connected at a major side edge of the segment 60. The first face segment 60 demarcated with the numeral "2" has a free major side edge. (It is understood the particular indicia numerals on face segments can vary.) The first face segment 60 demarcated with the numeral "0" has an initial connection tab 62 at a major side edge. Except for one location to be described, each minor distal edge of the first face segments 60 has a skin connection tab 64 extending therefrom. The skin connection tabs 64 have a triangular shape. The minor distal edge of the first face member 60 designated with the numeral 4 does not have a connection tab 64 but has the central connection interface 58 therein.

As further shown in FIG. 13, the second section 56 has a plurality of integrally connected second face segments 66. Similar to the first section 54, there are five second face segments 66 and the second face segments 60 are demarcated with the numerals 1, 3, 5, 7 and 9. It is understood that the numerals are inscribed on an opposite side of the second face segments 66 shown in FIG. 13. The second face segments 66 are generally kite-shaped and are generally integrally connected at a major side edge of the segment 66. The second face segment 66 demarcated with the numeral "1" has a free major side edge. The second face segment 66 demarcated with the numeral "9" has a final connection tab 68 at a major side edge. The second face segment 66 demarcated with the numeral "3" has the central connection interface 58 therein at a minor distal edge. Thus, the central connection interface 58 is between the first face segment 60 demarcated with the numeral "4" and the second face segment 66 demarcated with the numeral "3."

Figure 18:
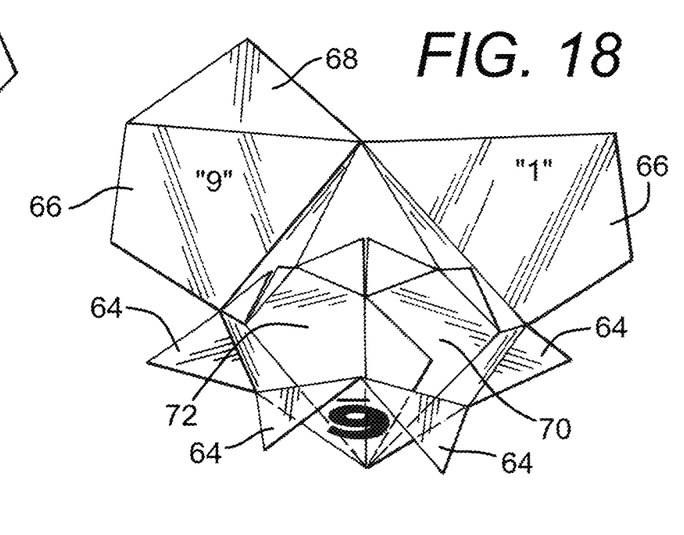
FIG. 18 show the outer skin in the intermediate folded configuration to receive the plurality of inserts.
Figures 19, 20, 21:
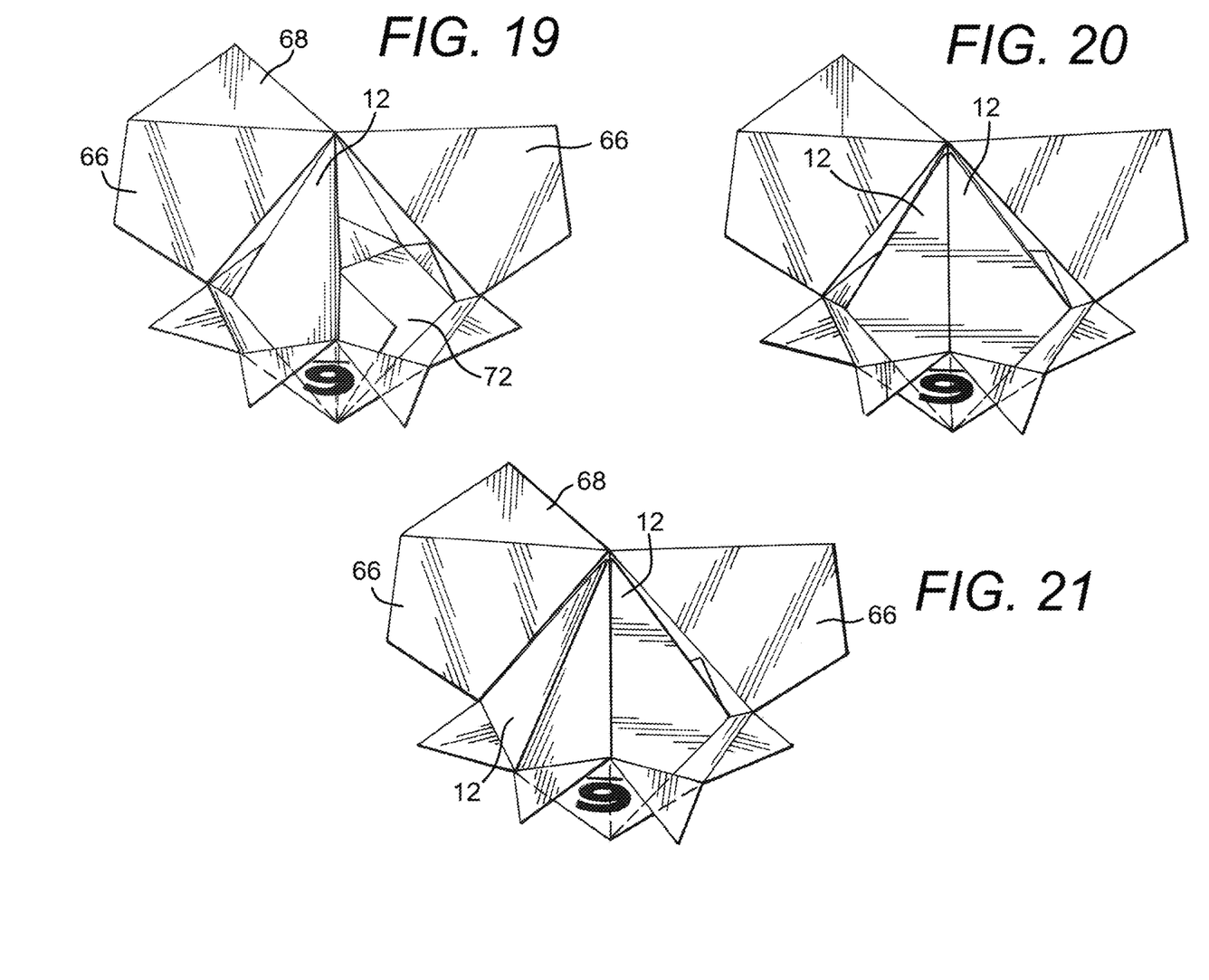
FIGS. 19-23 show the plurality of inserts being sequentially inserted into the outer skin.
Figures 22, 23, 24:
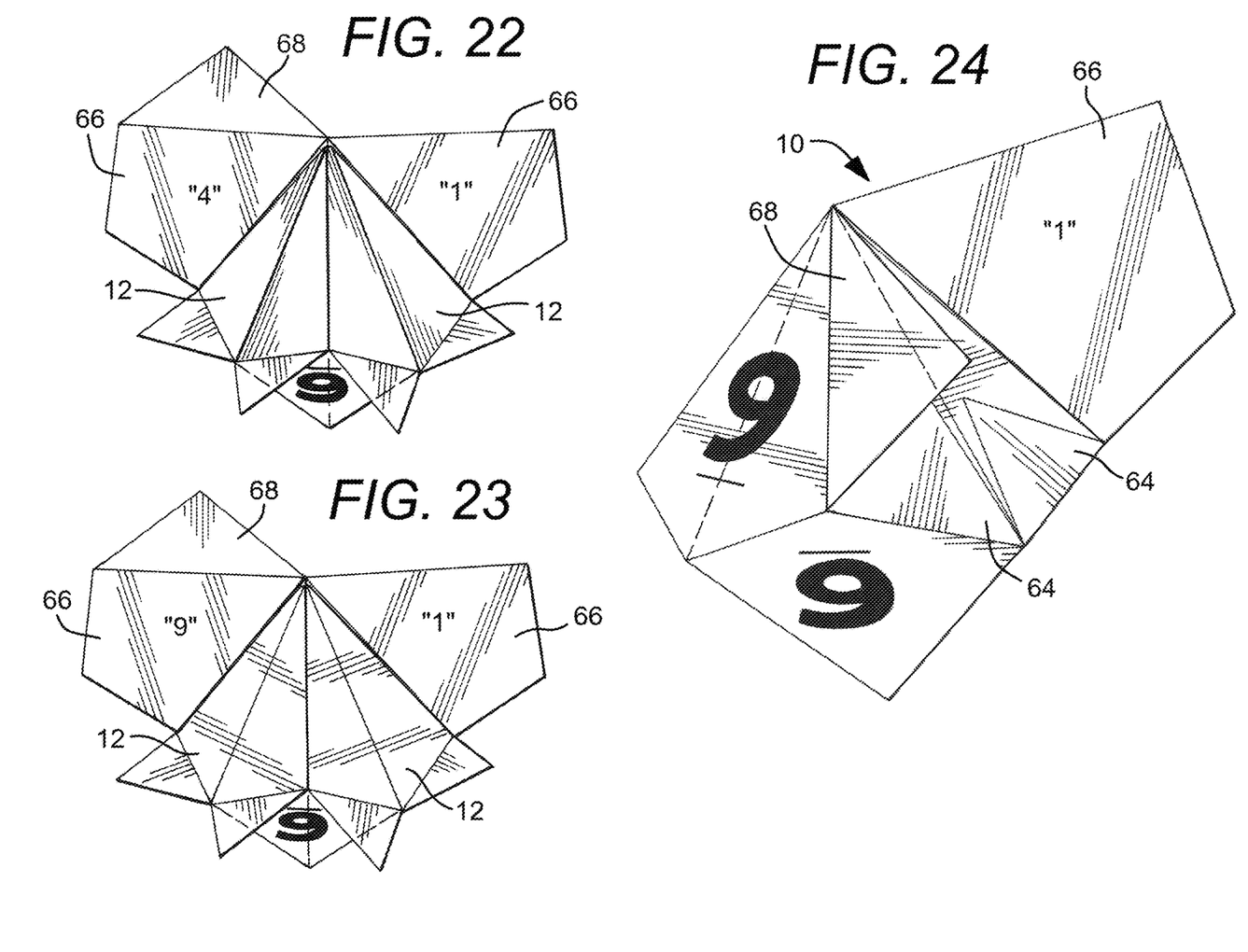
FIG. 24 show the outer skin having the plurality of inserts therein prior to the outer skin being secured in a folded configuration.

FIGS. 14-18 disclose the formation of the outer skin 14. It is understood that the skin planar member 52 is folded at respective interfaces between the first face segments 60, the second face segments 66, the initial connection tab 62, the skin connection tabs 64 and the final connection tab 68. As further shown in FIGS. 14-17, the connection tabs 64 are folded at the interfaces wherein the outer skin 14 begins to take the shape of the die 10. As can be appreciated from FIG. 18, the initial connection tab 62 is adhesively connected to the first face segment 60 demarcated with the numeral "2." Other skin connection tabs 64 are also adhesively connected to respective second face segments 66. Such connections are made until the second face segment 66 demarcated with the numeral "1" remains free as well as the second face segment 66 demarcated with the numeral "9" along with the final connection tab 68 as shown in FIG. 18. As further shown in FIG. 18, the outer skin 14 defines an internal cavity 70 as well as an insert opening 72 that is in communication with the internal cavity 70. It is understood that the rigidity-adding inserts 12 will be inserted into the internal cavity 70 through the insert opening 72 and the final connection tab 68 will be adhesively connected to the second face segment 66 demarcated with the numeral "1."

With the outer skin 14 formed into the intermediate configuration as shown in FIG. 18, the outer skin 14 is ready to accept the plurality of inserts 12. Without the inserts 12, and while the outer skin 14 has an initial amount of rigidity, it is understood that the outer skin 14 is capable of being folded upon itself with a squeeze of a user's hand. In this intermediate configuration, the outer skin 14 is also generally flexible wherein the skin 14 can be displaced via hand pressure. The plurality of inserts 12, five inserts 12 according to an exemplary embodiment, are formed according to the steps described above. It is understood that the outer skin 14 and inserts 12 are cooperatively sized wherein the five inserts 12 are received in the outer skin 14. FIGS. 19-24 show the plurality of inserts 12 inserted into the internal cavity 70 through the insert opening 72. The first insert 12 is inserted into the internal cavity 70 through the insert opening 72. It is understood that the kite-shaped face of the insert 12 is aligned in confronting relation to an internal surface of one of the kite-shaped faces of the outer skin 14. As can be appreciated from FIGS. 20-23, additional inserts 12 are inserted into the internal cavity 70 through the insert opening 72. The inserts 12 are positioned in adjacent relation to one another. Once all five inserts 12 are inserted and positioned in adjacent relation, it is understood that the kite-shaped outer faces 44 and the inclined outer faces 46 of the respective inserts 12 are in confronting relation to the internal surfaces of the first face segments 60 and second face segments 66 of the outer skin 14. The planar outer faces 42 of the respective inserts 12 are in confronting relation to planar outer faces 42 of adjacent inserts 12. It is understood that when the five inserts 12 are inserted into the outer skin 14, the collective outer surfaces of the inserts 12 are positioned respectively in confronting relation to the plurality of inner surfaces of the outer skin 14. Thus, as can be appreciated from FIG. 27, outer surfaces 80 of the insert 12 are on confronting relation to the inner surfaces 82 of the outer skin 14. The outer surfaces 80 may be in surface-to-surface engagement with the inner surfaces 82. As can be appreciated from FIG. 24, once all five inserts 12 are inserted, the final connection tab 68 is adhesively secured to the second face segment 66 demarcated with the numeral "1." Once adhesively secured, the die 10 is formed such as shown in FIG. 25. In its fully constructed configuration, the five inserts 12 are positioned in adjacent relation in the outer skin 14, similar to a configuration of an orange or grapefruit having a plurality of slices in adjacent relation within an outer skin of the fruit. As can be appreciated from the figures, in an exemplary embodiment, the outer skin 14 is folded to form a 10-sided skin decahedron shape, and the plurality of inserts 12 collectively form an insert decahedron shape dimensioned to fit within the skin decahedron shape of the outer skin 14.

FIGS. 25-29 show the die 10 in its fully constructed configuration. As discussed, the inserts 12 cooperatively provide rigidity to the outer skin 14 wherein a user handling the die cannot easily collapse the outer skin 14 by applying simple hand pressure via squeezing to the die 10. It is further noted that the paper member used to form the insert 12 has a weight that is the same as the weight of the paper member used to form the outer skin 14. Using the same weight paper members provides a more enhanced fit/connection of the insert 12 within the outer skin 14. In an exemplary embodiment, the paper members used to form the insert 12 and the outer skin 14 are 65-pound card stock paper and generally 176 grams/square meter. This weight may be considered a heavier, light-weight card stock or a medium-weight card stock. It is understood that other weighted paper members may be used. In other exemplary embodiments, card stock papers in the range of 60 pounds to 80 pounds could be utilized. It is also understood that in other embodiments, the respective paper members can have different weighted paper members. The paper member of the outer skin 14 is also suitably dyed of different colors as desired. The dye is provided such that colors are not compromised when folding the outer skin 14 to the desired shape of the die 10.

Figures 28, 29:
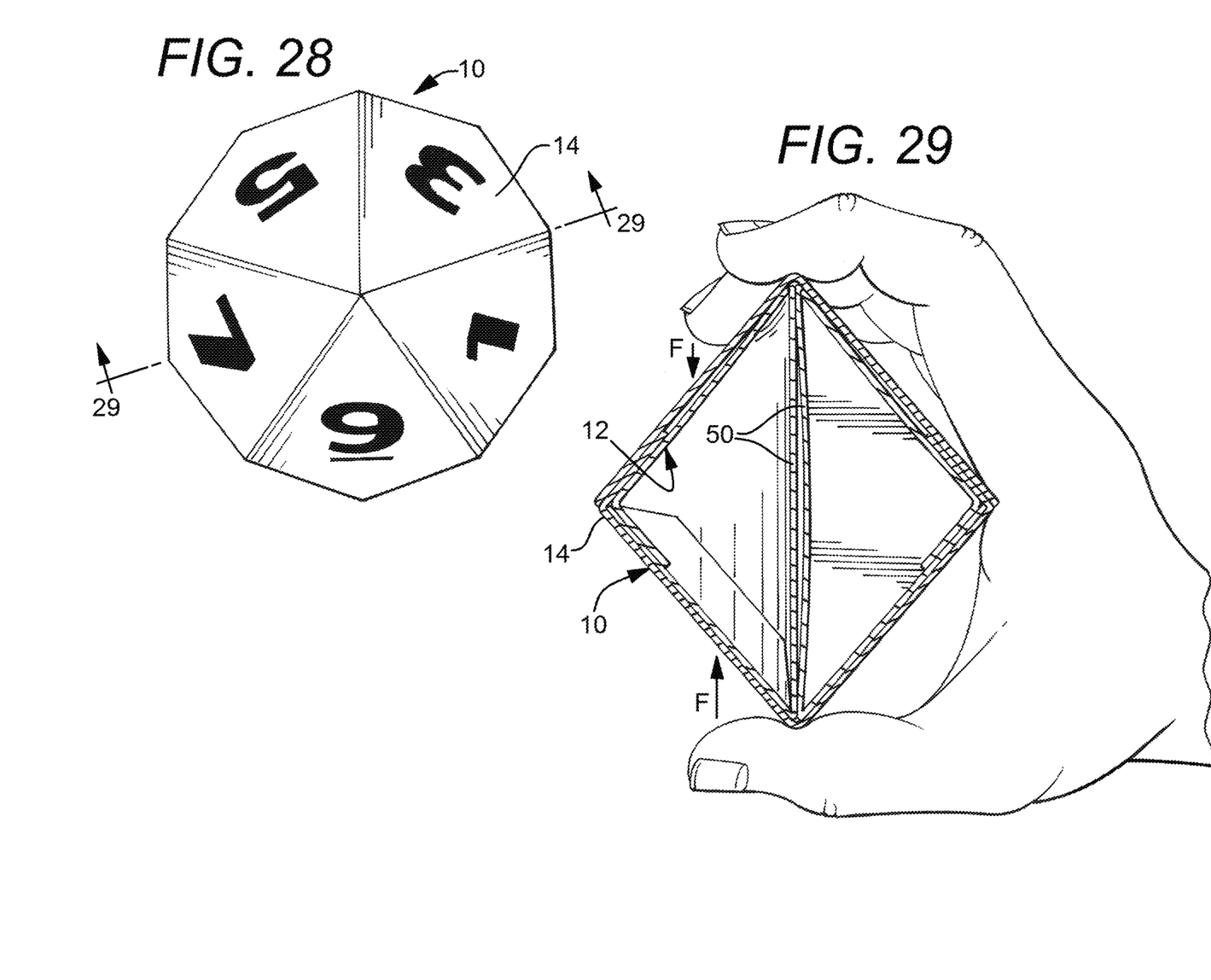
FIG. 28 is top plan view of the die.
FIG. 29 is a cross-sectional view of the die taken along line 29-29 in FIG. 28 and showing the die resisting compressive force by the user.

With the five inserts 12 formed, inserted into the internal cavity 70 defined by the outer skin 14, and the connection tabs of the outer skin 14 secured, the die 10 is formed. As discussed, the die 10 is used in a game such as an educational game for children. The children roll the die 10 during play of the game. With the inserts 12 contained within the outer skin 14, the die 10 has additional weight, which provides enhanced tactile feel for young players. Because of typical curious natures of children, it is not uncommon for children to attempt to squeeze the die providing a compressive force on the die 10. General play of the game can also lead to exciting events, which can also result in aggressive handling of the die 10 by child players or even other players. Other children may just be mischievous in nature and attempt to crush the die by squeezing in hands. Such squeezing or aggressive handling can apply compressive forces to the die 10 that can deform or otherwise permanently damage the die 10 as the paper-based die 10 has typically been a hollow-structure. The inserts 12 add rigidity to the die 10. The inserts 12 cooperate to provide an internal truss-like structure within the outer skin 14 such as shown in FIGS. 27 and 29. The internal walls 50 defined by the inserts 12 provide a support structure therefore adding rigidity to the die 10. With the inserts 12 positioned in adjacent relation within the outer skin 14, the die 10 resists compressive forces F applied to the die 10. It is understood that the compressive forces F could be applied at various locations on the die 10. In particular, children and even older players cannot collapse or deform the die 10 by squeezing the die 10 via hand pressure. The inserts 12 resist such compressive forces F. It is understood that the inserts 12 utilize triangular configurations which tend to maintain their respective shapes. The triangular configurations also push on adjacent triangular configurations which assists in resisting applied forces F. It is further understood that the forces F could be applied at various locations on the die 10. As shown in FIGS. 27 and 29, the internal walls 50 may deflect a certain amount when resisting force F applied to the die 10.

The die 10 of the present invention can also have alternative designs. The die 10 can be constructed in various sizes as desired. For example, a first die 10 can be provided and constructed according to the steps above, and a second die 10 can also be provided and constructed according to the steps above, but wherein the second die 10 has a different size than the first die 10. The second die 10 could have a visual perceptively different color than the first die 10. In one exemplary embodiment, the die 10 as described above is decahedron-shaped having 10 sides. Die having other shapes and number of sides could also be formed having a paper-based outer skin and various rigidity forming inserts. In one alternative example, a traditional cube-shaped die could have a single insert or plurality of inserts that provide rigidity to a paper-based outer skin.

The die 10 of the present invention provides several benefits. As discussed above, the inserts 12 add rigidity to the die 10. With the configuration of the inserts contained in cooperative fashion within the outer skin 14, the die 10 resists compressive forces applied to the die 10 such as by squeezing hand pressure by a user such as a child. The inserts 12 having triangular configurations assists in the ability of the inserts 12 to resist applied forces as the triangular configurations have a greater ability to keep their shape and also engage against other triangular structures. The inserts 12 also provide added weight to the die 10 providing an enhanced tactile feel for users of the die 10. The die 10 can also be constructed in different sizes and colors based on game designs. The inserts 12 are further formed from an ideal weight of paper stock, which provides a desired amount of added weight for tactile feel while allowing for easy folding of the paper member forming the insert 12. The paper member is further more environmentally-friendly as opposed to using a foam or plastic-based insert. The respective paper members forming the insert and the outer skin are also matched which provides for a better fit/connection of the insert 12 within the outer skin 14.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A decahedron-shaped 10-sided die comprising:
   a paper-based outer skin defining 10 faces, respective faces of the die numbered consecutively from 0 to 9, the outer skin defining an internal cavity and a plurality of inner surfaces opposite the respective faces and facing the internal cavity; and
   a set of five paper-based inserts positioned in adjacent relation in the internal cavity,
   each paper-based insert defining at least one connection tab and the insert having a plurality of folds wherein the at least one connection tab is secured to an adjacent segment of the insert wherein the insert has an irregular pyramid shape,
      wherein the five inserts are positioned in adjacent relation in the internal cavity wherein the five inserts collectively define a plurality of insert outer surfaces, the plurality of insert outer surfaces are positioned respectively in confronting relation to the plurality of inner surfaces of the outer skin,
   wherein the five inserts cooperatively resist compressive force applied to the outer skin via hand pressure of a user wherein the outer skin does not collapse upon itself in response to the compressive force.

\* \* \* \* \*